(12) United States Patent
Comte

(10) Patent No.: US 11,603,272 B2
(45) Date of Patent: Mar. 14, 2023

(54) PORTABLE ANIMAL LOADING CHUTE

(71) Applicant: Alain Comte, Notre-Dame (CA)

(72) Inventor: Alain Comte, Notre-Dame (CA)

(*) Notice: Subject to any disclaimer, the term of this patent is extended or adjusted under 35 U.S.C. 154(b) by 567 days.

(21) Appl. No.: 16/699,850

(22) Filed: Dec. 2, 2019

(65) Prior Publication Data

US 2021/0163239 A1    Jun. 3, 2021

(51) Int. Cl.
*B65G 67/04*    (2006.01)
*A01K 29/00*    (2006.01)

(52) U.S. Cl.
CPC .............. *B65G 67/04* (2013.01); *A01K 29/00* (2013.01)

(58) Field of Classification Search
CPC ...... A01K 1/0613; A01K 29/00; A01K 1/062; A01K 1/0023; A01K 1/0017; A01K 1/0029; B60P 3/04; B60P 1/43; B60P 3/42
USPC ....... 119/843, 512, 734, 840, 847, 848, 712, 119/473, 524; 296/24.31, 61
See application file for complete search history.

(56) References Cited

U.S. PATENT DOCUMENTS

| | | | | |
|---|---|---|---|---|
| 3,020,882 A | * | 2/1962 | Browning | A01K 1/0613 119/848 |
| 3,225,744 A | * | 12/1965 | Procter | B60P 1/36 119/846 |
| 2003/0140870 A1 | * | 7/2003 | Daniels | A01K 1/0613 119/752 |
| 2009/0266309 A1 | * | 10/2009 | Hunter | A01K 1/0613 119/751 |

* cited by examiner

*Primary Examiner* — Peter M Poon
*Assistant Examiner* — Jeffrey R Larsen
(74) *Attorney, Agent, or Firm* — Adrian D. Battison; Ade & Company Inc.; Ryan W. Dupuis

(57) ABSTRACT

A portable animal loading chute includes a floor and side walls for transferring animals from the ground to a higher semi-trailer and smaller lower trailer for transportation. The whole chute including both the base and side walls move upwardly and downwardly to the height of the vehicle. What we did is make the angle of the loading chute is designed at half way between both heights so that a triangular gap is formed as the end faces of the side walls are not vertical and do not meet the vertical walls at the ground and trailer. Thus a small rectangular panel is mounted at each end of each side wall that can pivot to adjust to give the final required angle for to meet the vertical walls at the respective height.

17 Claims, 3 Drawing Sheets

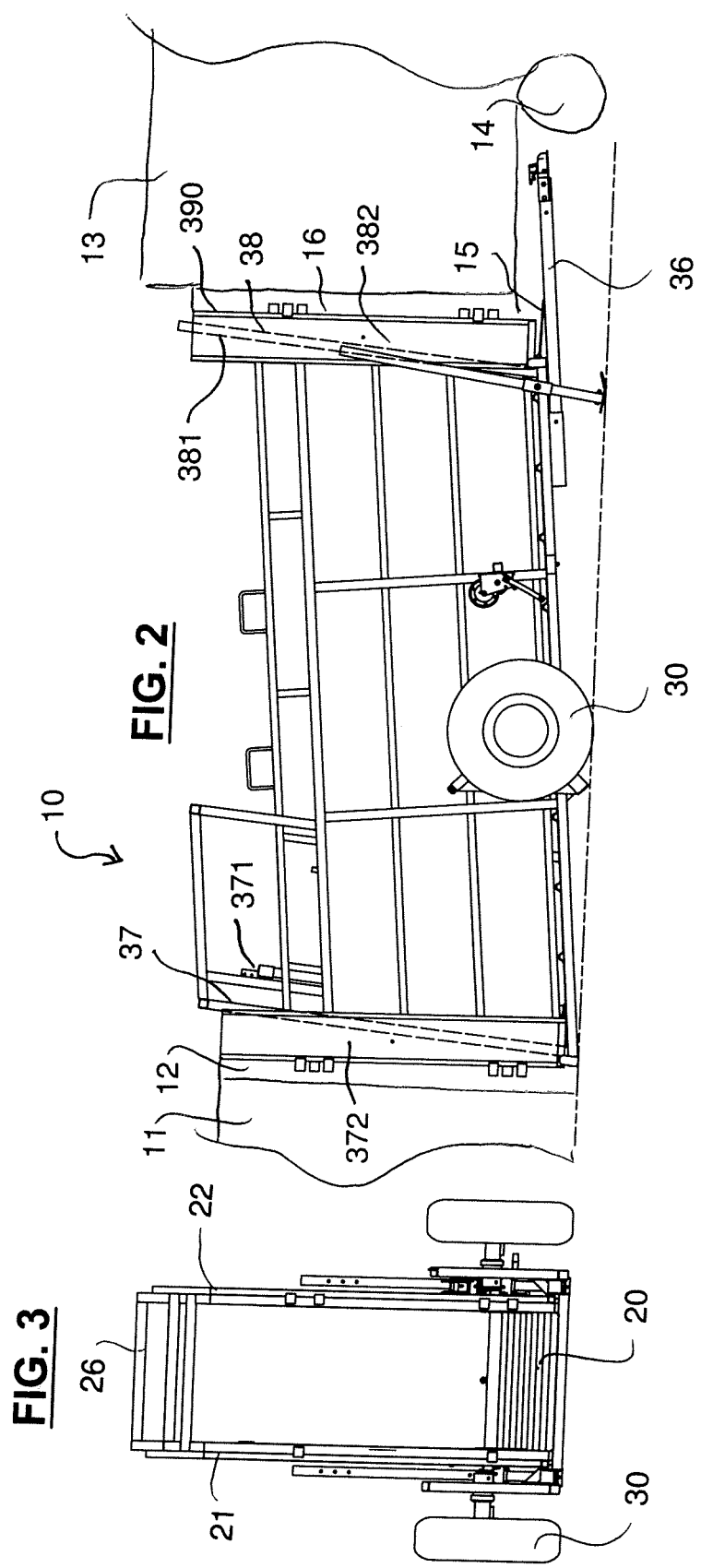

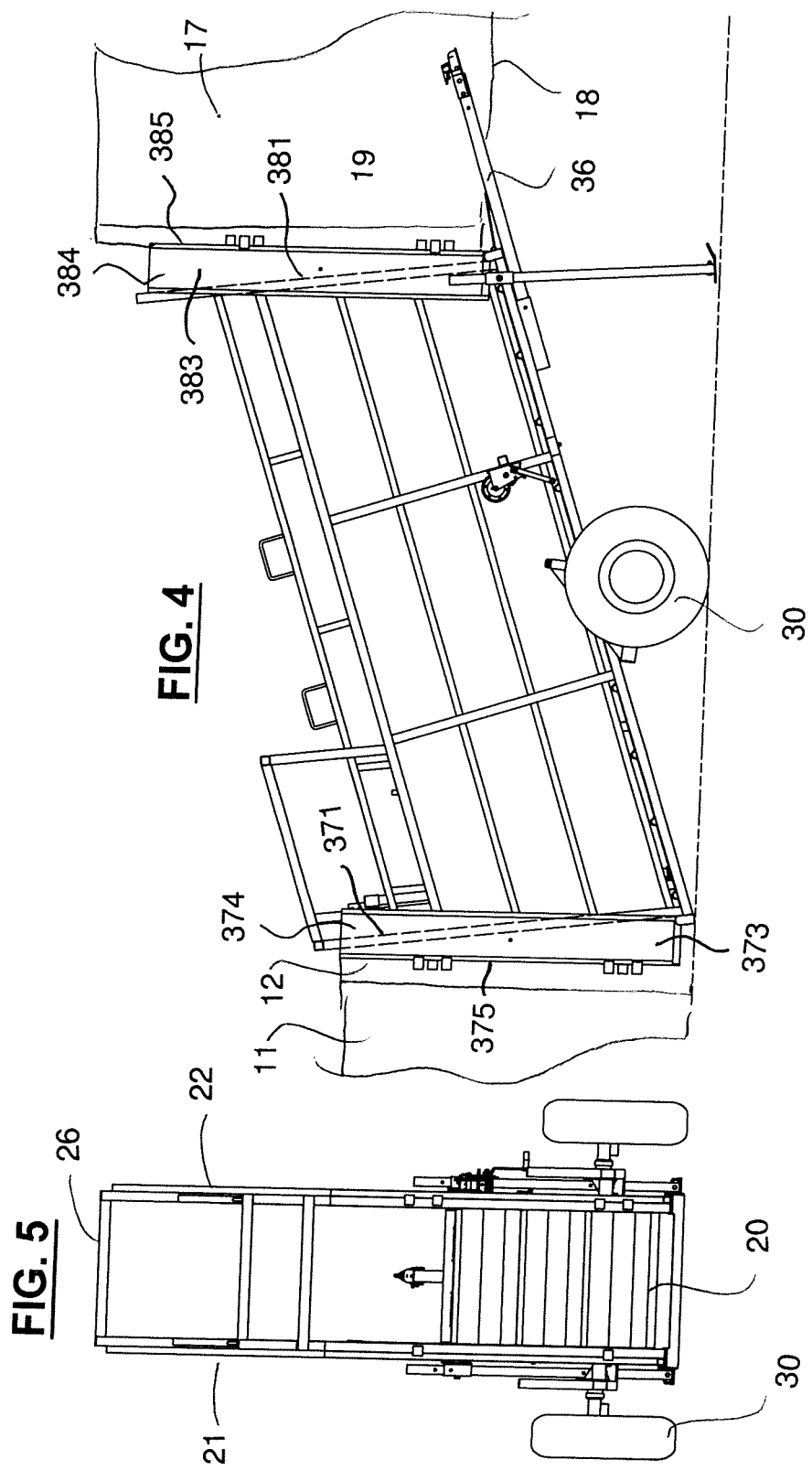

PORTABLE ANIMAL LOADING CHUTE

This invention relates to a portable animal loading chute which can be used to transfer animals from a first level such as the ground to a second raised level such as the bed of a transportation container.

BACKGROUND OF THE INVENTION

It is known to provide a portable chute for loading livestock into a transporting vehicle which includes a base on which the animals stand or walk as they move toward the vehicle and side walls upstanding from the base and extending along respective sides for confining the animals as they move.

The base is carried on ground wheels for transportation and includes supports for raising one end of the chute to align with the vehicle to be loaded. The other end is typically dropped to the ground so that animals moving along containment alleys when they reach the lower end are able to walk up the inclined base and move into the vehicle for transportation.

It will be appreciated that the end face defined by the side walls must match up against the vertical end of the containment alley at the ground and must also match up against the vertical end of the vehicle at the floor of the trailer. If there are gaps caused by misalignment, the animals will be encouraged by any such gap to attempt to escape through the gap in that any small gap, even if insufficient for the animal to actually escape, will potentially cause an escape attempt with significant risk of injury to the animal and to the handlers.

In a situation where the chute is dedicated to a particular type of transportation vehicle at a constant height for example semi-trailers, the end faces of the side walls can be arranged at an angle to the base or floor of the chute so that the end face is vertical when the base is at the required angle to load that type of vehicle.

However there are requirements to load both semi-trailers which have a high floor and other types of trailers at a much lower floor level. In this situation it is not possible to fix the side walls at the required angle since that angle changes.

Other loading chutes have floors that lift up and down independently of the side walls to give the right height, but such designs are complex, significantly higher in transport height and are much bulkier. This one the whole chute moves up and down.

That is it is one object to the present invention to provide an animal loading chute that can adjust for both higher semi-trailer and smaller lower trailer where the whole chute including both the base and side walls move upwardly and downwardly.

SUMMARY OF THE INVENTION

According to the invention there is provided a portable animal loading chute for loading animals from a confinement container onto a first transportation vehicle at a first height and a second transportation vehicle at a second lower height, the loading chute comprising:

a chute floor having a loading end and a discharge end over which the animals can pass;

ground wheels for transporting the chute floor to a required location for a loading required vehicle having a transportation floor at a predetermined height;

ground supports operable to tilt the chute floor so that the discharge end is raised to the height of the transportation floor;

first and second side walls mounted on the loading chute so as to stand upwardly from the chute floor on respective sides of the chute floor for confining the animals onto the chute floor;

the first side wall having an upstanding loading end edge and an upstanding discharge end edge where the loading end edge is arranged to brought up to a vertical wall of the confinement container and the discharge end edge is arranged to brought up to a vertical wall of the first and second transportation vehicles;

the loading end edges of the first side and second walls are arranged at an angle such that when brought up to the vertical wall of the confinement container the loading end edge is at an angle to the vertical wall so as to define a triangular space therebetween;

the discharge end edge of the first and second side walls are arranged at an angle such that when brought up to the vertical wall of each of the first and second transportation vehicles the discharge end edge is at an angle to the vertical wall so as to define a triangular space therebetween;

the first and second side walls having at their loading end a loading confinement panel having a cooperating edge, the loading confinement panel being movable relative to the loading end edge so that the cooperating edge of the loading confinement panel is movable to a vertical position immediately adjacent the vertical wall of the confinement container;

the first and second side walls having at their discharge end a discharge confinement panel having a cooperating edge, the discharge confinement panel being movable relative to the discharge end edge so that the cooperating edge of the discharge confinement panel is movable to a vertical position immediately adjacent the vertical wall of the first transportation vehicle and immediately adjacent the vertical wall of the second transportation vehicle.

Typically the side walls and the confining panels are closed to prevent the animals viewing the exterior.

In one embodiment the confining panels lie in a plane parallel to the side walls and preferably immediately adjacent to and outward of a plane of the respective side wall and the confining panels are pivotal about a respective axis transverse to the respective side wall so as to move parallel to the respective side wall.

In one embodiment the axis is spaced from both a top and bottom of the confining panel so that both the top and bottom move inwardly and outwardly relative to the respective side wall and preferably approximately at a mid-height of the confining panel so that both the top and bottom move inwardly and outwardly relative to the respective side wall by approximately the same distance. However the axis may be located at the top or at the bottom taking into account that this will require a greater distance of movement to fill the triangular space For simplicity of manufacture and to provide sufficient stiffness the confining panels comprise a flat sheet with a post at one upstanding edge. In this arrangement, the post abuts an end post of the respective side wall when moved to an extreme end position of its movement.

In one embodiment, the chute is manufactured so that it has end edges which are not parallel to the vertical end walls in either the position of the higher trailer or at the lower position and typically at an angle which is approximately half way between. The confining panels then have two extreme positions of movement where the confining panels are at one extreme position with the first vehicle and at an opposed extreme position with the second vehicle.

In one embodiment there is provided a hitch at a forward end for towing on the ground wheels.

In one embodiment the supports comprise upstanding stands at the discharge end to raise the discharge end to the height of the first and second vehicles and preferably the ground wheels can be raised and lowered so as to provide support in both the positions for the first and second transportation vehicles.

Preferably the discharge end edge of the first and second side walls is parallel to the loading end edge of the first and second side walls so that the confining panels are symmetrical and move the same distances.

In one embodiment the discharge and loading end edges of the first and second side walls are inclined at an angle to a plane at right angles to the floor. Preferably the angle is arranged so that the discharge end edges are at a first angle to the vertical wall of the first vehicle and the discharge end edges are at a second angle to the vertical wall of the second vehicle where the first and second angles are approximately equal.

BRIEF DESCRIPTION OF THE DRAWINGS

One embodiment of the invention will now be described in conjunction with the accompanying drawings in which:

FIG. 2 is a side elevational view of the loading chute of FIG. 1 showing the chute in a lowered inclined position for loading onto a lower type of trailer.

FIG. 3 is an end elevational view of the loading chute of FIG. 1 showing the chute in the position of FIG. 2.

FIG. 4 is a side elevational view of the loading chute of FIG. 1 showing the chute in a raised inclined position of FIG. 1.

FIG. 5 is an end elevational view of the loading chute of FIG. 1 showing the chute in the position of FIG. 1.

In the drawings like characters of reference indicate corresponding parts in the different figures.

DETAILED DESCRIPTION

Figure 1:
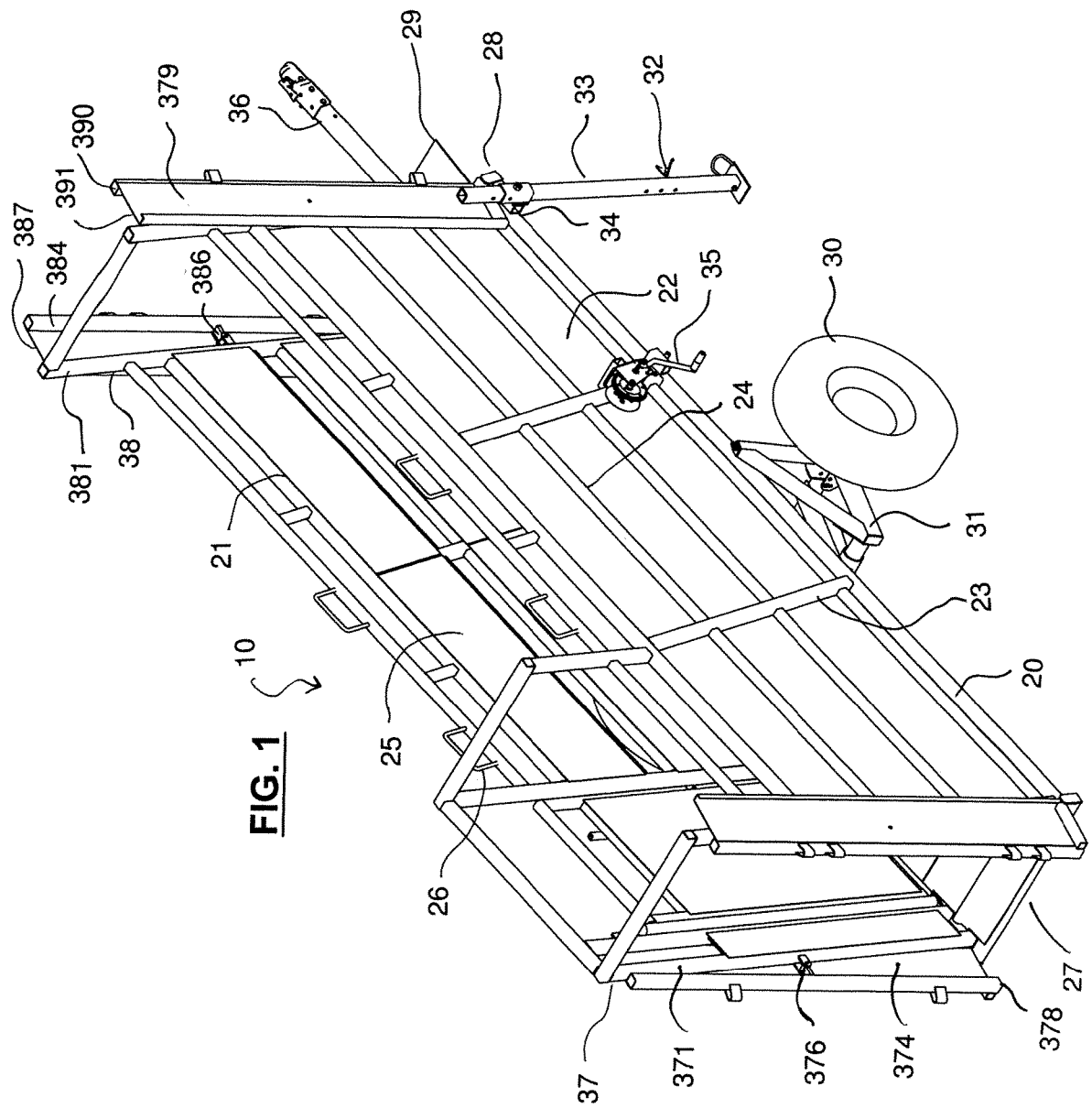
FIG. 1 is an isometric view of a portable animal loading chute according to the present invention showing the chute in a raised inclined position for loading onto a semi-trailer at a raised height.

One embodiment of a portable animal loading chute 10 is shown in FIGS. 1, 2 and 4 for loading animals. The chute is arranged to transfer the animals from a confinement container 11 such as an alley defined by side walls along which the animals are driven. The alley includes an end face 12 which is vertical with the side walls standing horizontally on the ground and the end faces standing upwardly therefrom.

In FIG. 2 is shown one transportation trailer or vehicle 13 sitting on ground wheels 14 supporting a floor 15 at a height spaced from the ground by a lower height which in one practical example is of the order of 15 inches. The trailer includes a rear wall 16 which stands vertical that is at right angles to the floor and typically includes a door which confines the animals to enter through a narrow opening into the area confined by the trailer.

In FIG. 4 is shown a first transportation vehicle 17 typically a semi-trailer at a height in one example which is around 50 inches. This includes a floor 18 and a vertical rear wall 19 which typically contains a door.

The chute comprises a chute floor 20 and two upstanding side walls 21 and 22. The side walls are formed of posts 23 and rails 24 covered by a sheet 25 so that the walls are closed to prevent vision outwardly by animals confined between the walls. The walls are connected by cross members 26 which hold them vertical and parallel at a spacing to confine the animals to move one behind the other as they pass from the alley to the transportation vehicle.

The chute floor 20 has a loading end 27 arranged to sit on the ground and a discharge end 28 including a flap 29 which forms a surface allowing unbroken surface over which the animals can pass to the vehicle.

The floor is connected to ground wheels 30 carried on mounting 31 for transporting the chute floor to a required location for loading a required vehicle having a transportation floor atone of the predetermined heights depending on the type of vehicle being used.

At the discharge end of the floor is provided ground supports 32 operable to tilt the chute floor so that the discharge end is raised to the height of the transportation floor. The supports comprise upstanding stands or posts 33 at the discharge end slidable in sleeves 34 and manually operable to raise the discharge end to a selected height matching that of the first and second vehicles depending on the type of vehicle to be loaded.

The ground wheels can be raised and lowered by a winch and cable system 35 to a selected height so as to provide support from the ground in both the positions for the first and second transportation vehicles when the discharge end is supported at the selected height on the posts 33.

In order to transport the portable chute from place to place for loading as required, there is provided a hitch 36 at a forward end for towing on the ground wheels.

The posts of the first and second side walls are welded to side rails of the floor mounted on the loading chute so as to stand vertically upwardly from the chute floor on respective sides of the chute floor for confining the animals onto the chute floor as they move to the vehicle.

The side walls are symmetrical and equal so that only one will be described in detail. Thus the first side wall 21 has an upstanding loading end edge 37 defined by an end post 371 and an upstanding discharge end edge 38 again defined by an end post 381. The posts 371 and 381 form end ones of a series of posts 23 all standing at right angles to the floor at spaced positions along the floor.

The discharge end edge 38 of the side wall is parallel to the loading end edge 37 of the side wall. However the end posts 371 and 381 of the side wall are not at right angles to the floor but instead are inclined at an angle to a plane at right angles to the floor.

As shown in FIG. 2 at the lower loading height and in FIG. 4 at the higher loading height, when the loading end edge 371 is brought up to the vertical wall 12 of the confinement container the loading end edge is at an angle to the vertical wall 12 so as to define a triangular space therebetween. In FIG. 2 the triangular space 372 increases in width from the bottom up to the top of the post 371. In FIG. 4 the triangular space 373 increases in width from the top down to the bottom of the post 371. Therefore in neither position is the post 371 parallel to the vertical wall 12. Symmetrically at the discharge end the post 382 is not parallel to the vertical walls 16 and 19 in either position so as to define again triangular spaces 382 and 383.

In order that the triangular spaces are not apparent or available to the animals in the chute with the potential for an escape attempt, the side wall carries, at its loading end 37, a loading confinement panel 374 and at its discharge end a discharge confinement panel 384. The loading confinement panel 374 defines a separate end edge 375 which is independent of the end edge 371. The panel 374 also is movable relative to the loading end edge 371 so that the cooperating edge 375 of the loading confinement panel is movable to a vertical position immediately adjacent the vertical wall 12 of the confinement container.

Symmetrically the side wall has at its discharge end 38 the discharge confinement panel 384 again having a cooperating edge 385. The discharge confinement panel 384 is again movable relative to the discharge end edge 381 so that the cooperating edge 385 of the discharge confinement panel is movable to a vertical position immediately adjacent the vertical wall 16 of the first transportation vehicle and immediately adjacent the vertical wall 19 of the second transportation vehicle.

As best shown in FIG. 1, the confining panels 374 and 384 lie in a plane parallel to and immediately outside of the side wall 21 and are pivotal about a respective axis 376 and 386 transverse to the respective side wall and connected to the respective end post of the side wall so as to move in the pivotal movement parallel to a plane of the side wall 21.

The axis is defined by a bracket attached to the end post and is located approximately at a mid height of the confining panel so as to be spaced from both a top 387 and bottom 378 of the confining panel so that both the top and bottom move inwardly and outwardly in a direction away from the end post relative to the side wall 21. The mounting of the axis approximately at a mid-height of the confining panel means that both the top and bottom move inwardly and outwardly relative to the respective side wall by approximately the same distance.

The confining panels 374, 384 are formed from a flat sheet 379 of metal with a post 390 at one upstanding edge and a bent stiffening edge 391 at the other edge.

In view of the symmetrical arrangement so that the angle of the end posts is midway between the two operating positions relative to the two vehicles and the mounting of the axis at the mid height, the post 390 abuts the end post 381 of the side wall when moved to the extreme end position of its movement shown in FIG. 2 and when moved to the opposite extreme position as shown in FIG. 4.

The arrangement herein thus provides a simple construction where the floor remains in fixed position relative to the side walls and the problem of the triangular spaces is solved by the confining panels which close the spaces and avoid any appearance to eh animal that there is an escape route. The panels are simple sheets defining a flat surface closing the space and can pivot over small distances to obtain the required closure in both the higher and lower positions because the panel moves in both positions and is symmetrical about a mid-height between the two positions.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A portable animal loading chute for loading animals from a confinement container onto a first transportation container at a first height and onto a second transportation container at a second lower height, the loading chute comprising:
   a chute floor having a loading end and a discharge end over which the animals can pass;
   ground wheels for transporting the chute floor to a required location for a loading required vehicle having a transportation floor at a predetermined height;
   ground supports operable to tilt the chute floor so that the discharge end is raised to the height of the transportation floor;
   first and second side walls mounted on the loading chute so as to stand upwardly from the chute floor on respective sides of the chute floor for confining the animals onto the chute floor;
   the first side wall having an upstanding loading end edge and an upstanding discharge end edge where the loading end edge is arranged to brought up to a vertical wall of the confinement container and the discharge end edge is arranged to brought up to a respective vertical wall of the first and second transportation containers;
   the loading end edge of the first side wall being arranged at an angle such that when brought up to the vertical wall of the confinement container the loading end edge is at an angle to the vertical wall so as to define a first triangular space therebetween;
   the discharge end edge of the first side wall being arranged at an angle such that when brought up to the respective vertical wall of each of the first and second transportation containers the discharge end edge is at an angle to the respective vertical wall so as to define respective triangular spaces therebetween;
   the second side wall having an upstanding loading end edge and an upstanding discharge end edge where the loading end edge is arranged to brought up to a vertical wall of the confinement container and the discharge end edge is arranged to brought up to a respective vertical wall of the first and second transportation containers;
   the loading end edge of the second side wall being arranged at an angle such that when brought up to the vertical wall of the confinement container the loading end edge is at an angle to the vertical wall so as to define a first triangular space therebetween;
   the discharge end edge of the second side wall being arranged at an angle such that when brought up to the respective vertical wall of each of the first and second transportation containers the discharge end edge is at an angle to the respective vertical wall so as to define respective triangular spaces therebetween;
   the first side wall having at its loading end a loading confinement panel having a cooperating edge, the loading confinement panel being movable relative to the loading end edge so that the cooperating edge of the loading confinement panel is movable to a vertical position immediately adjacent the vertical wall of the confinement container;
   the first side wall having at its discharge end a discharge confinement panel having a cooperating edge, the discharge confinement panel being movable relative to the discharge end edge so that the cooperating edge of the discharge confinement panel is movable to a first vertical position immediately adjacent the vertical wall of the first transportation container and a second vertical position immediately adjacent the vertical wall of the second transportation container;
   the second side wall having at its loading end a loading confinement panel having a cooperating edge, the loading confinement panel being movable relative to the loading end edge so that the cooperating edge of the loading confinement panel is movable to a vertical position immediately adjacent the vertical wall of the confinement container;

and the second side wall having at its discharge end a second discharge confinement panel having a second cooperating edge, the second discharge confinement panel being movable relative to the discharge end edge of the second side wall so that the second cooperating edge of the second discharge confinement panel is movable to a first vertical position immediately adjacent the vertical wall of the first transportation container and a second vertical position immediately adjacent the vertical wall of the second transportation container;

wherein each of the loading confinement panels and each of the first and second discharge confinement panels lie in a plane parallel to the respective one of the first and second side walls;

and wherein each of the loading confinement panels and each of the first and second discharge confinement panels is movable to the first and second vertical positions in a respective plane parallel to the respective one of the first and second side walls.

2. The loading chute according to claim 1 wherein the first and second side walls and the confining panels thereon are impermeable to prevent the animals viewing therethrough.

3. The loading chute according to claim 1 wherein the confinement panels are pivotal about a respective axis transverse to the respective side wall.

4. The loading chute according to claim 3 wherein the transverse axis is spaced from both a top and bottom of the respective confinement panel so that both the top and bottom move inwardly and outwardly relative to the respective side wall in said respective plane.

5. The loading chute according to claim 3 wherein the transverse axis is approximately at a mid-height of the respective confinement panel so that both the top and bottom move inwardly and outwardly relative to the respective side wall in said respective plane.

6. The loading chute according to claim 1 wherein the confinement panels are located in said respective plane which lies immediately adjacent to and outward of the respective side wall.

7. The loading chute according to claim 1 wherein each of the confinement confining panels comprises a flat sheet with a post at one upstanding edge.

8. The loading chute according to claim 7 wherein the post abuts an end post of the respective side wall when moved to an extreme end position of its movement.

9. The loading chute according to claim 1 wherein the discharge end edge of the first and second side walls is parallel to the loading end edge of the first and second side walls and wherein the loading end edges and discharge end edges of the first and second side walls are located at a fixed position inclined at an angle to a plane at right angles to the floor.

10. A portable animal loading chute for loading animals from a confinement container onto a first transportation container at a first height and onto a second transportation container at a second lower height, the loading chute comprising:

a chute floor having a loading end and a discharge end over which the animals can pass;

ground wheels for transporting the chute floor to a required location for a loading required vehicle having a transportation floor at a predetermined height;

ground supports operable to tilt the chute floor so that the discharge end is raised to the height of the transportation floor;

first and second side walls mounted on the loading chute so as to stand upwardly from the chute floor on respective sides of the chute floor for confining the animals onto the chute floor;

the first side wall having an upstanding loading end edge and an upstanding discharge end edge where the loading end edge is arranged to brought up to a vertical wall of the confinement container and the discharge end edge is arranged to brought up to a respective vertical wall of the first and second transportation containers;

the loading end edge of the first side wall being arranged at an angle such that when brought up to the vertical wall of the confinement container the loading end edge is at an angle to the vertical wall so as to define a first triangular space therebetween;

the discharge end edge of the first side wall being arranged at an angle such that when brought up to the respective vertical wall of each of the first and second transportation containers the discharge end edge is at an angle to the respective vertical wall so as to define respective triangular spaces therebetween;

the second side wall having an upstanding loading end edge and an upstanding discharge end edge where the loading end edge is arranged to brought up to a vertical wall of the confinement container and the discharge end edge is arranged to brought up to a respective vertical wall of the first and second transportation containers;

the loading end edge of the second side wall being arranged at an angle such that when brought up to the vertical wall of the confinement container the loading end edge is at an angle to the vertical wall so as to define a first triangular space therebetween;

the discharge end edge of the second side wall being arranged at an angle such that when brought up to the respective vertical wall of each of the first and second transportation containers the discharge end edge is at an angle to the respective vertical wall so as to define respective triangular spaces therebetween;

the first side wall having at its loading end a loading confinement panel having a cooperating edge, the loading confinement panel being movable relative to the loading end edge so that the cooperating edge of the loading confinement panel is movable to a vertical position immediately adjacent the vertical wall of the confinement container;

the first side wall having at its discharge end a discharge confinement panel having a cooperating edge, the discharge confinement panel being movable relative to the discharge end edge so that the cooperating edge of the discharge confinement panel is movable to a first vertical position immediately adjacent the vertical wall of the first transportation container and a second vertical position immediately adjacent the vertical wall of the second transportation container;

the second side wall having at its loading end a loading confinement panel having a cooperating edge, the loading confinement panel being movable relative to the loading end edge so that the cooperating edge of the loading confinement panel is movable to a vertical position immediately adjacent the vertical wall of the confinement container;

and the second side wall having at its discharge end a second discharge confinement panel having a second cooperating edge, the second discharge confinement panel being movable relative to the discharge end edge of the second side wall so that the second cooperating edge of the second discharge confinement panel is movable to a first vertical position immediately adjacent the vertical wall of the first transportation container and a second vertical position immediately adjacent the vertical wall of the second transportation container;

wherein each of the loading confinement panels and each of the first and second discharge confinement panels lie in a plane parallel to the respective one of the first and second side walls;

and wherein each of the loading confinement panels and each of the first and second discharge confinement panels is movable in a respective plane parallel to the respective one of the first and second side walls to the first and second vertical positions;

wherein the discharge end edge of the first and second side walls is parallel to the loading end edge of the first and second side walls;

wherein the loading end edges and discharge end edges of the first and second side walls are located at a fixed position inclined at an angle to a plane at right angles to the floor;

and wherein each of the loading confinement panels is movable between a first extreme position inclined upwardly and outwardly relative to the respective loading end edge of the respective side wall and a second extreme position inclined downwardly and outwardly relative to the respective loading end edge of the respective side wall;

and wherein each of the first and second discharge confinement panels is movable between a first extreme position inclined upwardly and outwardly relative to the respective discharge end edge of the respective side wall and a second extreme position inclined downwardly and outwardly relative to the respective discharge end edge of the respective side wall.

11. The loading chute according to claim 10 wherein the first and second side walls and the confinement panels thereon are impermeable to prevent the animals viewing therethrough.

12. The loading chute according to claim 10 wherein the confinement panels are pivotal about a respective axis transverse to the respective side wall.

13. The loading chute according to claim 12 wherein the transverse axis is spaced from both a top and bottom of the respective confinement panel so that both the top and bottom move inwardly and outwardly relative to the respective side wall in said respective plane.

14. The loading chute according to claim 12 wherein the transverse axis is approximately at a mid-height of the respective confinement panel so that both the top and bottom move inwardly and outwardly relative to the respective side wall in said respective plane.

15. The loading chute according to claim 10 wherein the confinement panels are located in said respective plane which lies immediately adjacent to and outward of the respective side wall.

16. The loading chute according to claim 10 wherein each of the confinement panels comprises a flat sheet with a post at one upstanding edge.

17. The loading chute according to claim 16 wherein the post abuts an end post of the respective side wall when moved to an extreme end position of its movement.

* * * * *